US008616356B2

(12) United States Patent
Thibaut et al.

(10) Patent No.: US 8,616,356 B2
(45) Date of Patent: Dec. 31, 2013

(54) FRICTION CLUTCH DEVICE COMPRISING DOUBLE DAMPING FLYWHEEL HAVING SECONDARY ASSEMBLY FIXEDLY MOUNTED AXIALLY RELATIVE TO REACTION PLATE

(75) Inventors: François Thibaut, Longueau (FR); Patrice Bertin, Mery-sur-Oise (FR); Daniel Fenioux, Saleux (FR); Patrice Merou, Sains en Amienois (FR); Ivan Dutier, Amiens (FR)

(73) Assignee: Valeo Embrayaes, Amiens (FR)

( * ) Notice: Subject to any disclaimer, the term of this patent is extended or adjusted under 35 U.S.C. 154(b) by 378 days.

(21) Appl. No.: 12/933,566

(22) PCT Filed: Mar. 18, 2009

(86) PCT No.: PCT/FR2009/050451
§ 371 (c)(1),
(2), (4) Date: Dec. 3, 2010

(87) PCT Pub. No.: WO2009/122096
PCT Pub. Date: Oct. 8, 2009

(65) Prior Publication Data
US 2011/0120831 A1 May 26, 2011

(30) Foreign Application Priority Data
Mar. 25, 2008 (FR) ...................... 08 51905

(51) Int. Cl.
*F16D 21/06* (2006.01)
*F16F 15/134* (2006.01)
*F16F 15/139* (2006.01)

(52) U.S. Cl.
USPC ..................... 192/48.8; 192/55.61; 192/70.17

(58) Field of Classification Search
USPC ................... 192/55.61, 70.17, 48.8; 74/574.4
See application file for complete search history.

(56) References Cited

U.S. PATENT DOCUMENTS

| 5,673,598 | A | * | 10/1997 | Duclos | 464/68.4 |
| 5,878,856 | A | * | 3/1999 | Sudau et al. | 192/70.17 |
| 5,971,857 | A | * | 10/1999 | Friedmann et al. | 464/24 |
| 2002/0060118 | A1 | * | 5/2002 | Beneton et al. | 192/48.8 |
| 2006/0289263 | A1 | * | 12/2006 | Friedmann et al. | 192/48.8 |
| 2008/0179157 | A1 | * | 7/2008 | Zhou et al. | 192/48.1 |

FOREIGN PATENT DOCUMENTS

| EP | 1 361 102 | 11/2003 |
| EP | 1 862 687 | 12/2007 |
| EP | 1 862 689 | 12/2007 |
| FR | 2778439 A | 11/1999 |
| FR | 2 886 996 | 12/2006 |
| FR | 2 895 476 | 6/2007 |
| WO | WO 2007/000151 | 1/2007 |
| WO | WO 2007/082500 | 7/2007 |

* cited by examiner

*Primary Examiner* — Richard M. Lorence
(74) *Attorney, Agent, or Firm* — Berenato & White, LLC

(57) ABSTRACT

A friction clutch device for coupling a first rear motor shaft to a second front forced shaft by allowing free relative axial displacement between the two shafts. The clutch device includes a double shock-absorbing steering wheel having a primary couple input assembly which is fixedly mounted axially to the motor shaft, a secondary couple output assembly which is rotatably connected to a reactive plate of the clutch device which is supported by the forced shaft. An elastic circumferential action member is arranged in a cavity that is peripheral to the primary assembly to rotatably connect the secondary assembly, with circumferential shock absorption, to the primary assembly. The secondary assembly is fixedly mounted axially relative to the reactive plate.

17 Claims, 4 Drawing Sheets

FRICTION CLUTCH DEVICE COMPRISING DOUBLE DAMPING FLYWHEEL HAVING SECONDARY ASSEMBLY FIXEDLY MOUNTED AXIALLY RELATIVE TO REACTION PLATE

The invention relates to a friction clutch device, in particular for a motor vehicle, in order to couple a first rear drive shaft and at least a second front driven shaft, whilst making possible at least one free relative axial clearance of one shaft in relation to the other.

The invention relates more particularly to a friction clutch device, in particular for a motor vehicle, in order to couple a first rear drive shaft to at least a second front driven shaft, whilst making possible at least one free relative axial clearance of one shaft in relation to the other, the clutch device comprising a double damping flywheel which comprises:
- a primary torque intake assembly which is fitted secured axially on a front end section of the drive shaft;
- a secondary torque output assembly which is connected in rotation to a reaction plate of the clutch device, and is supported by a rear end section of the driven shaft, the secondary assembly being fitted secured axially relative to the reaction plate; and
- at least one resilient unit with circumferential action which is provided in a peripheral receptacle of the primary assembly, in order to connect the secondary assembly to the primary assembly in rotation, with circumferential damping.

Numerous friction clutch devices for motor vehicles are already known, wherein the rotary elements which are supported by the driven shaft are also guided in rotation on the drive shaft by means of a rolling bearing without axial play. A device of this type is described for example in document FR-A-2,778,439.

However, the invention concerns clutch devices of the type in which the rear end section of the driven shaft is not guided relative to the front end section of the drive shaft by means of a bearing. In this type of device, a front end section of the drive shaft and a corresponding rear end section of the driven shaft are both projecting. Thus, the front end section of the drive shaft is free to have axial clearance in relation to the rear end section of the driven shaft, with a finite maximum amplitude, in particular when the drive shaft is a crankshaft of a combustion engine.

This type of clutch device can be equipped with an inertia flywheel of the double damping flywheel type. An inertia flywheel of this type comprises mainly a primary assembly which is connected in rotation without axial play to the front end of a drive shaft, and a secondary assembly which is connected in rotation, with or without angular play, to a reaction plate of the clutch device. The secondary assembly is fitted onto the primary assembly in a manner which is integral in rotation by means of a circumferential damping mechanism which permits a certain amount of angular clearance.

An inertia flywheel of this type can filter the rotational jolts of the crankshaft which forms the drive shaft, whilst conveying the rotational torque from the crankshaft to the reaction plate.

When the engine is running, the primary assembly can be displaced axially with a certain amount of clearance relative to the driven shaft, in particular as a result of the flexure of the crankshaft which is caused by the explosions in the cylinders of the combustion engine.

In order to take into account these relative axial displacements, it is known to fit the secondary assembly of the double damping flywheel such that it is axially mobile relative to the reaction plate.

It is known for example to fit the secondary assembly on a grooved section of a connection element, with the reaction plate. For this purpose, the secondary assembly comprises a central aperture provided with radial teeth which are received in the axial channels of the grooves.

The axial grooves thus permit transmission of the rotational movement and of the torque to the reaction plate, whilst permitting axial displacement of the secondary assembly on the grooved section, along the entire amplitude of the axial clearance. The two, primary and secondary assemblies of the double damping flywheel are thus rendered integral in axial displacement with the drive shaft.

However, an arrangement of this type can give rise to knocking noises between the teeth of the secondary assembly and the grooves, in particular during sudden variations of speed.

In order to solve this problem, document WO-A-2007/000.151 proposes a noise-prevention device which comprises means for fitting the body which forms the secondary assembly which is pre-stressed circumferentially in the grooves of the element for connection to the reaction plate, in order to avoid knocking of the teeth of the body against the grooves.

However, a device of this type is costly and complex to produce, since it comprises many parts which are added to the secondary assembly.

In order to eliminate these problems in particular, the invention proposes a device of the type previously described, characterised in that:
- the reaction plate is fitted axially fixed relative to the driven shaft, such that the secondary assembly is fixed axially relative to the driven shaft; and
- the secondary assembly is fitted in the primary assembly with sufficient axial play to permit free axial clearance of one shaft relative to the other, without interference between the primary assembly and the secondary assembly.

According to other characteristics of the invention:
- the clutch device comprises at least one friction element which is interposed axially between the primary assembly and the secondary assembly, and closes constantly in a sealed manner a peripheral receptacle in the primary assembly which accommodates the resilient unit with circumferential action, the friction element being fitted fixed in rotation relative to one of the assemblies, known as the support assembly, and to rub against the other assembly, known as the friction assembly;
- the primary assembly comprises a rear primary flywheel and a front primary cover which are arranged axially on both sides of the secondary assembly, a first one of the said friction elements being interposed axially between the secondary assembly and the primary cover, and a second one of the said friction elements being interposed axially between the primary flywheel and the secondary assembly;
- at least one friction element is interposed axially between the primary assembly and the secondary assembly, such as to prevent the occurrence of noises from vibration of the secondary assembly, each friction element being fitted such as to slide axially on the support assembly;
- axial pre-stressing means are interposed axially between the friction element and the support assembly, in order to maintain constant contact between the friction element and the friction assembly;

the pre-stressing means are formed by radial washers which are resiliently deformable in an axial direction;

the clutch device comprises at least one pair of friction elements which are arranged axially on both sides of the secondary assembly and opposite one another;

at least one friction element is formed by a sealing washer which is secured to the support assembly, and is in permanent contact with the friction assembly by means of resilience, such as to permit sealing which is adapted to the peripheral receptacle;

the sealing washer is formed by a metal washer;

the first friction element is a friction washer, and the second friction element is a sealing washer;

the secondary assembly comprises at least one axial surface for stressing an associated axial thrust surface opposite the resilient unit with circumferential action, at least one of the associated axial stressing or thrust surfaces having axial dimensions which are sufficient to be opposite the other surface during the axial clearance of one shaft relative to the other;

the thrust surface of the secondary assembly is formed by plastic deformation of a portion of axial radial section of a transverse lug, such as to be widened axially relative to the axial thickness of the lug;

the secondary assembly comprises a secondary body;

the clutch device comprises an intermediate body which is connected in rotation to the secondary assembly by means of a circumferential damping mechanism with angular play;

the front end section of the drive shaft is free to be displaced relative to the rear end section of the driven shaft, the secondary assembly being arranged with radial play relative to the primary assembly, so as to permit the free radial clearance of one shaft relative to the other;

the base of the peripheral receptacle which accommodates the resilient unit is formed such as to permit the radial and axial clearances of the stressing lug of the resilient unit of the secondary assembly; and the double damping flywheel comprises means for limiting the radial clearance of one shaft relative to the other.

Other characteristics and advantages will become apparent from reading the following detailed description, for understanding of which reference will be made to the attached drawings, in which.

Hereinafter in the description, elements which have identical, analogous or similar functions will be designated by the same reference numbers.

In order to assist understanding of the description and the claims, use will be made, on a non-limiting basis, of an axial orientation which faces from the rear forwards, which is indicated by the arrow "A" in the figures, and is parallel to the axis of rotation "B" of the clutch device 10, and a radial orientation which faces from the interior to the exterior, from the axis of rotation "B" of the friction clutch device 10.

Figure 1:
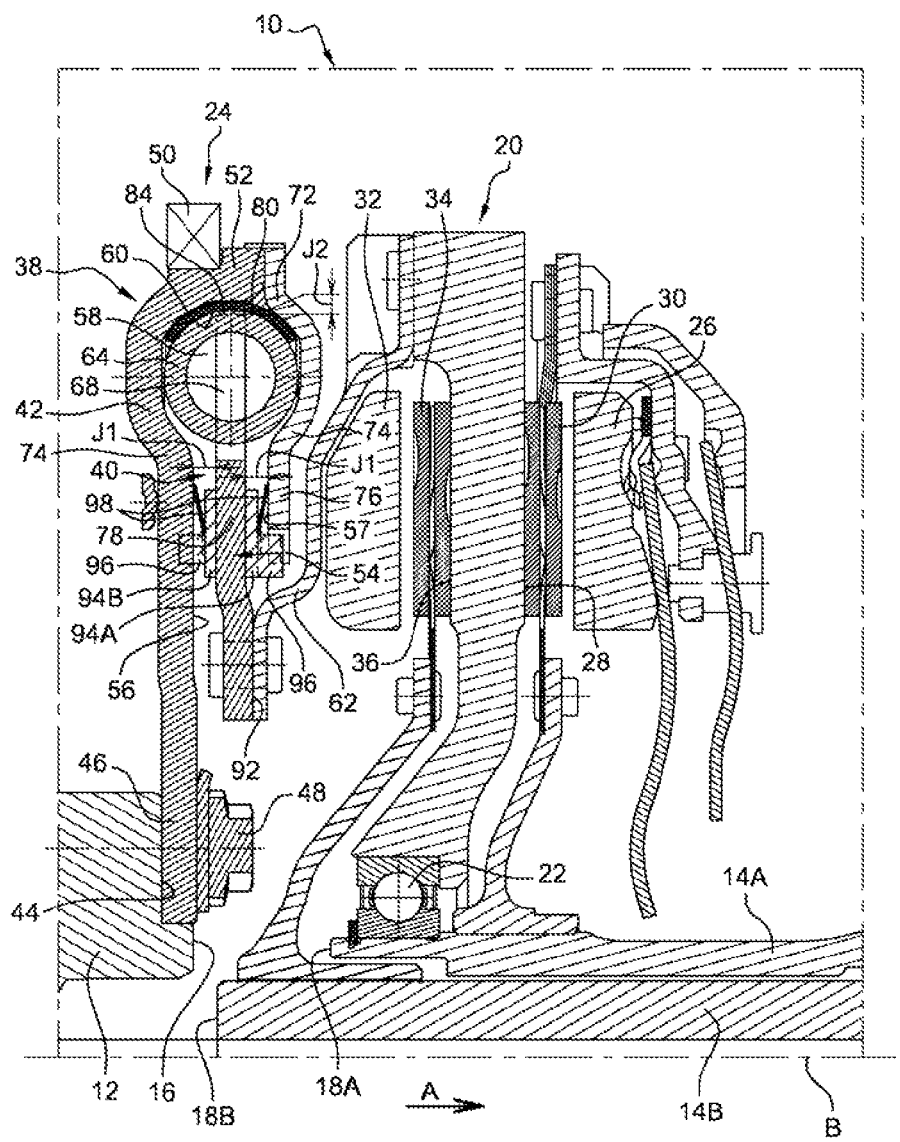
FIG. 1 is a half-view in axial cross-section according to the cross-sectional plane 1-1 in FIG. 2, which represents a friction clutch device comprising a double damping flywheel produced according to the teaching of the invention.

FIG. 1 shows a clutch device 10 which is designed to couple a drive shaft which is arranged axially towards the rear, and a free front end section 12 of which is represented on the left in FIG. 1, with at least one driven shaft 14 which is arranged axially forwards.

The free front end section 12 of the drive shaft and the corresponding rear end section 14 of the driven shaft are both projecting.

Hereinafter in the description and in the claims, for the sake of simplicity the terms "free front end section of the drive shaft 12" and "free rear end section of the driven shaft 14" will be designated respectively by "the drive shaft 12" and "the driven shaft 14", unless it is specified that the shaft as a whole is being taken into consideration.

The drive shaft 12 is rotatable around an axis of rotation "B", and is rotated by an engine (not represented) of the motor vehicle. The shaft is for example a crankshaft of an internal combustion engine.

The clutch device 10 shown in FIG. 1 comprises two driven shafts, the free rear end sections 14A, 14B of which are represented.

The driven shafts 14A, 14B are fitted such as to rotate substantially coaxially to the drive shaft 12. The first driven shaft 14A forms a axial tube, inside which the second driven shaft 14B is provided. Each of the driven shafts 14A, 14B can rotate independently from the other.

The free front end 16 of the drive shaft 12 is arranged axially to the rear of, and spaced from the free rear ends 18A, 18B of the driven shafts 14A, 14B.

The driven shafts 14A, 14B are connected to a rear gearbox (not represented). More particularly, the first driven shaft corresponds to certain gears of the gearbox, for example the odd-numbered gears, whereas the second shaft corresponds to the other gears, for example the even-numbered gears.

The clutch device 10 comprises first means for temporary coupling of the first driven shaft 14A to the drive shaft 12, which are supported only by the first driven shaft 14A.

In a known manner, the clutch device 10 comprises a circular radial reaction plate 20 which is fitted such as to rotate freely around the axis of rotation "B". The reaction plate 20 is rotatably supported by the first driven shaft 14A, by means of a ball bearing 22.

The reaction plate 20 is more particularly fitted secured axially to the first driven shaft 14A. For this purpose, the inner ring of the ball bearing 22 is locked axially in both directions, and the outer ring of the ball bearing 22 is fitted clamped onto the reaction plate 20.

In addition, the reaction plate 20 is integral in rotation with the drive shaft 12 by means of a double damping flywheel 24 which is provided at a rear end of the clutch device 10, and will be described in greater detail hereinafter.

The first coupling means also comprise a first front annular pressure plate 26, which is fitted such as to be integral in rotation with the reaction plate 20, around the axis of rotation "B", and is fitted such as to slide axially relative to the reaction plate 20. The front pressure plate 26 is more particularly arranged axially opposite a front surface 28 of the reaction plate 20.

A first front coaxial friction disc 30 is interposed axially between the reaction plate 20 and the front pressure plate 26. The front friction disc 30 comprises an annular friction seal on its two surfaces.

The front friction disc 30 is fitted such as to be integral in rotation with the first driven shaft 14A, and such as to slide axially on the first driven shaft 14A.

The front friction disc 30 is designed to be clamped against the front surface 28 of the reaction plate 20 by the front pressure plate 26, in order to couple the first driven shaft 14A to the drive shaft 12 temporarily, i.e. in such a way that it can be disengaged.

The clutch device 10 also comprises second means for temporary coupling of the second driven shaft 14B to the drive shaft 12, which are arranged symmetrically in relation to the first coupling means, relative to the reaction plate 20, and are supported by the driven shafts 14A, 14B.

The second coupling means thus comprise a second rear pressure plate 32 and a rear friction disc 34 for the temporary coupling of the second driven shaft 14B to the drive shaft 12. The functions respectively of the rear pressure plate 32 of the rear friction disc 34 are analogous respectively to those of the front pressure plate 26 of the front friction disc 30.

The rear pressure plate 32 is fitted axially opposite the rear surface 36 of the reaction plate 20. The rear pressure plate 32 is integral in rotation with the reaction plate 20 and slides axially relative to the reaction plate 20.

The rear friction disc 34 is fitted so as to be integral in rotation with the second driven shaft 14B, and is fitted such as to slide axially on the second driven shaft 14B.

Thus, the rear friction disc 34 is designed to be clamped against the rear surface 36 of the reaction plate 20 by the rear pressure plate 32, in order to couple the second driven shaft 14B temporarily with the drive shaft 12.

The double damping flywheel 24 will now be described in detail. The double damping flywheel 24 comprises an engine torque intake element, which in this case is formed by a primary rear assembly 38, and an engine torque output element, which is this case is formed by secondary front assembly 40.

The primary assembly 38 comprises an annular rear primary flywheel 42 which extends radially coaxially to the axis of rotation "B". The primary assembly 38 is supported by the drive shaft 12, and is connected in rotation to the drive shaft 12 without radial play, without angular clearance around the axis "B", and without axial play.

For this purpose, a front end securing flange 44 which is formed at the free front end 16 of the drive shaft 12 is secured against a rear end surface of a hub 46 of the primary flywheel 42 of the primary assembly 38, by means of a plurality of screws 48, a single one of which is represented in FIG. 1. The primary assembly 38 is thus integral with the displacements of the free end 16 of the drive shaft 12 in all directions, and in particular axially.

The primary assembly 38 also supports a toothed starter ring 50, which is arranged around an outer peripheral axial surface of the primary flywheel 42 of the primary assembly 38.

The primary assembly 38 comprises on its outer periphery a skirt 52 which extends axially forwards from an outer peripheral edge of the primary flywheel 42.

The secondary assembly 40 comprises a secondary body 54 which forms a ring which extends radially around the axis of rotation "B". The secondary body 54 is more particularly arranged radially to the front of, and spaced from, a front radial surface 56 of the primary flywheel 42, inside a cavity in the primary assembly 38 which is delimited radially by the skirt 52.

The secondary flywheel 54 has an outer peripheral diameter which is smaller than the diameter of the primary flywheel 42, such as to provide an annular peripheral receptacle 58 between the outer peripheral edge of the secondary flywheel 54 and the inner peripheral surface 60 of the skirt 52, as will be described hereinafter.

The secondary body 54 is connected in rotation to the reaction plate 20, which itself is supported by the first driven shaft 14A. The secondary body 54 is supported only by the first driven shaft 14A.

In the example represented in FIG. 1, the secondary body 54 is supported integrally in rotation by the reaction plate 20, by means of a rigid connection element 62 in the form of an annular cover which surrounds the rear pressure plate 32.

The secondary body 54 is connected in rotation to the primary assembly 38 with damped angular clearance.

Figure 2:
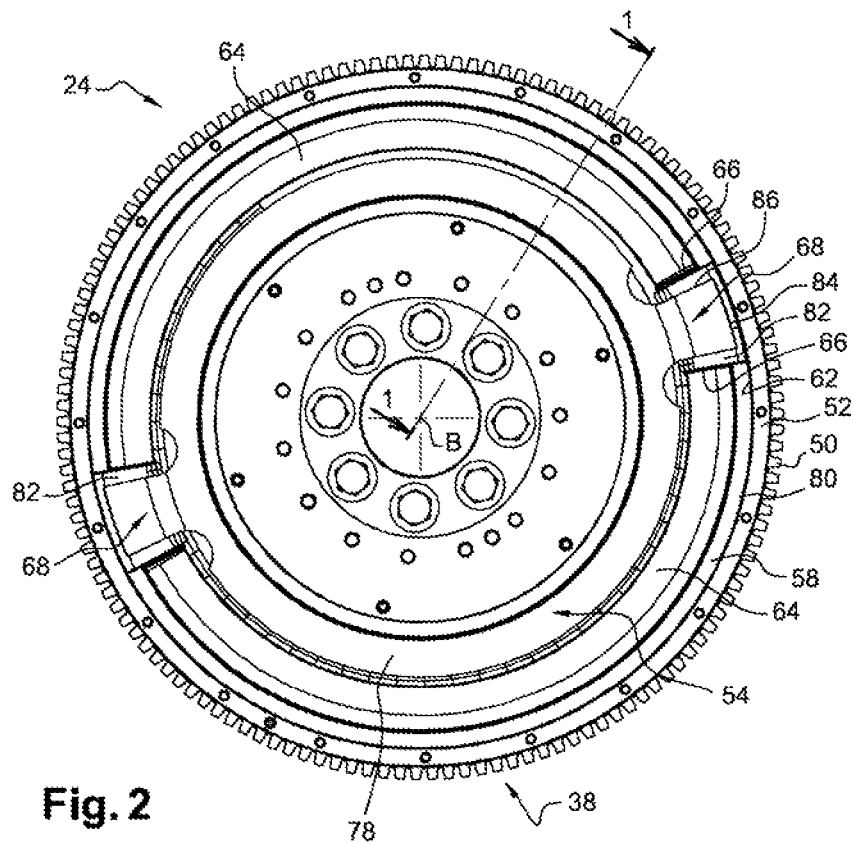
FIG. 2 is a front view which represents the double damping flywheel in FIG. 1 fitted without its primary cover.

For this purpose, at least one resilient unit 64 with circumferential action is provided in the peripheral receptacle 58 of the primary assembly 38. The resilient unit 64 is interposed circumferentially between a support surface 66 of the primary assembly 38 and a support lug 68 of the secondary body 54, as represented in FIG. 2.

More particularly, the double damping flywheel 24 comprises two resilient units 64 which are arranged symmetrically relative to a diameter of the primary flywheel 42. Hereinafter, a description will be provided of a single one of these resilient units 64, since the description applies by symmetry to the other resilient unit 64.

The resilient unit 64 is more particularly formed by a helical spring which extends circumferentially in an arc of a circle, for example around an angular sector of approximately 150°.

As represented in FIG. 1, the resilient unit 64 is arranged against the radially inner axial surface 60 of the peripheral skirt 52 of the primary assembly 38 which forms the base of the peripheral receptacle 58. The peripheral receptacle 58 is closed axially at the rear by the primary flywheel 42 of the primary assembly 38, and axially at the front by a radial annular primary cover 72 of the primary assembly 38 which is secured to a front end edge of the skirt 52.

The radial displacements of the resilient unit 64 are limited towards the exterior by the skirt 52, and towards the interior by an axial throat formed by the contours 74 of the primary flywheel 42 of the primary assembly 38 and the primary cover 72.

Thus, the primary cover 72 comprises an annular inner end portion 76 which is arranged opposite the front surface 56 of the primary flywheel 42 of the primary assembly 38, at an axial distance which is smaller than the axial width of the resilient unit 64, in order to form the throat, but is large enough to permit the passage of the secondary body 54.

In addition, an outer annular portion 78 of the secondary body 54 is interposed axially in the throat of the primary assembly 38. More particularly, the diameter of the outer peripheral edge of the secondary body 54 is larger than the inner peripheral diameter of the primary cover 72.

A guide funnel 80 is interposed radially between the resilient unit 64 and the base 58 of the peripheral receptacle 58, in order to assist the circumferential displacements of its turns, when the resilient unit 64 is placed against the base 58 of the peripheral receptacle 58 by centrifugal force. The funnel 80 has the same circumferential length as the resilient unit 64, when the clutch device 10 is at rest.

The peripheral receptacle 58 is delimited circumferentially by a first upstream axial radial support surface 66, and by a second downstream axial radial support surface 66. For this purpose, the front surface 56 of the primary flywheel 42 of the primary assembly 38 and the rear surface 57 of the primary cover 72 each comprise two diametrically opposed bosses 82. The lateral surfaces of the bosses 82 thus form the radial support surfaces 66 which delimit the two peripheral receptacles 58.

The bosses 82 of the primary cover 72 are arranged axially opposite, and spaced from, the bosses 82 of the primary flywheel 42.

The secondary body 54 comprises two lugs 68 which extend radially from the outer peripheral edge of the secondary body 54, as far as a free outer end 84. Each lug 68 is arranged axially between two matching bosses 82 of the primary flywheel 42 and the primary cover 72.

Each lug 68 is delimited circumferentially by two radial sections 86, one portion of which forms a stress surface 90, which is designed to come into contact with the end opposite of the wire of the resilient unit 64, in order to thrust the resilient units 64 in one direction or the other. Thus, the axial end surface of the wire of the resilient unit 64 forms a thrust surface 88 which is associated with the stress surface 90 opposite of the secondary body 54.

Each lug 68 occupies an angular sector which is substantially identical to that of the bosses 82, as represented in FIG. 2.

The secondary body 54 can thus pivot in both directions around the axis "B" relative to the primary assembly 38, for example by 60° more or less, by thrusting the resilient units 64 by means of the lugs 68. The resilient units 64 are then compressed, whilst being supported on the corresponding support surfaces 66 of the bosses 82.

Figure 4:
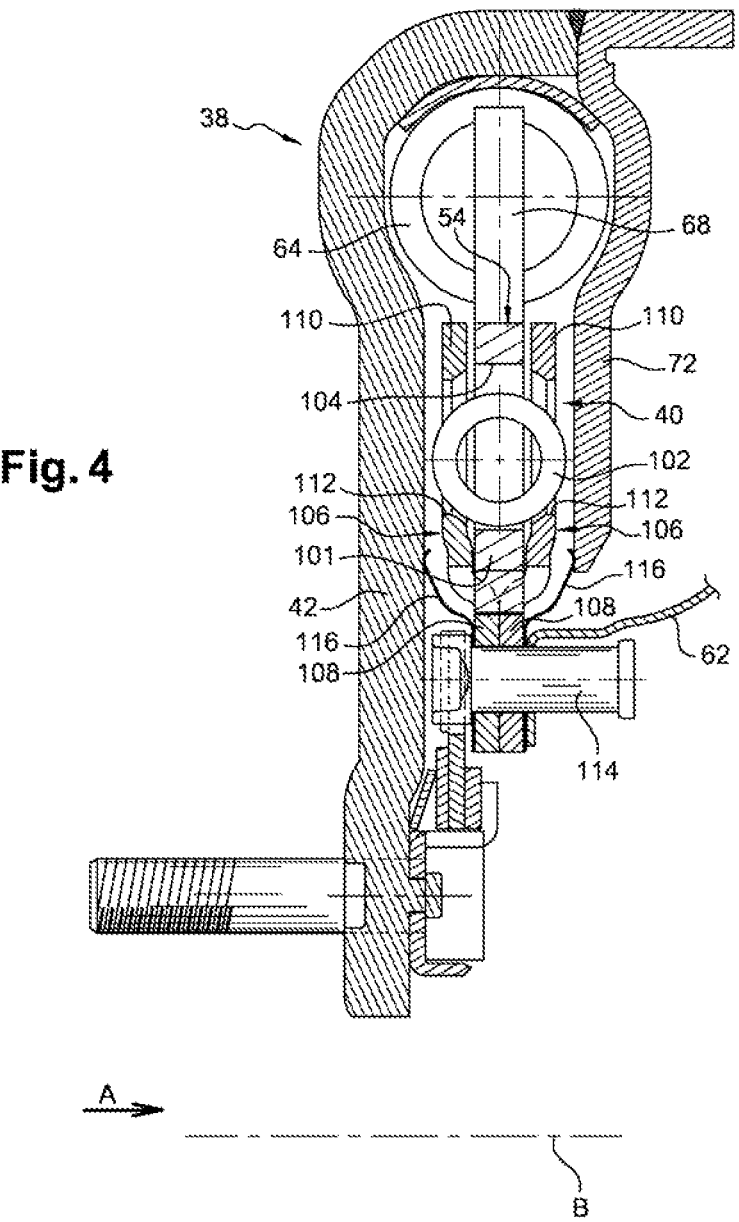
FIG. 4 is a view similar to that of FIG. 1, which represents a second embodiment of the invention.

In order to permit the pivoting of the secondary body 54 around the axis "B" relative to the primary assembly 38, the secondary body 54 is received with axial play "J1" between the primary flywheel 42 and the primary cover 72, as illustrated in FIG. 4.

The lugs 68 of the secondary body 54 are also received with radial play "J2" between their outer end edge 84 and the inner surface 60 of the skirt 52. More particularly, this radial play "J2" is greater than the radial thickness of the guide funnels 80 of the resilient units 64.

The clutch device 10 is designed such as to permit at least one relative free axial clearance of the drive shaft 12 in relation to the driven shafts 14A, 14B. The drive shaft 12 is not guided relative to the first driven shaft 14A.

In the example represented in the figures, the front end 16 of the drive shaft 12 is free to be displaced radially and axially in all directions relative to the driven shafts 14A, 14B.

The maximum amplitude of the axial clearance of the drive shaft 12 relative to the driven shafts 14A, 14B depends in particular on the resilience of the drive shaft 12 considered as a whole, the speed of rotation of the combustion engine, and the securing play of the engine and the gearbox on the structure of the motor vehicle.

According to the teaching of the invention, the secondary body 54 is fixed axially (i.e., non-movably connected in the axial direction) relative to the reaction plate 20. Since the reaction plate 20 itself is fixed axially relative to the first driven shaft 14A, the secondary body 54 is thus fixed axially relative to the first driven shaft 14A. In other words, both the reaction plate 20 and the secondary body 54 are non-movably connected in the axial direction to the first driven shaft 14A.

More particularly, as represented in FIG. 1, an annular portion 92 of the inner periphery of the front radial surface of the secondary body 54 is secured against a surface opposite of the connection element 62 by rivets, screws, or any other appropriate securing means.

The connection element 62 is itself secured to the reaction plate 20, in this case by means of screws. Thus, the secondary body 54, the connection element 62 and the reaction plate 20 are attached together by a mechanical connection which is known as "full" or "embedding".

Thus, the secondary body 54 is axially integral with the first driven shaft 14A, whereas the primary assembly 38, comprising the rear primary flywheel 42 and the primary cover 72, is integral axially with the drive shaft 12.

The secondary body 54 is fitted in the primary assembly 38 with axial play "J1" which is sufficient to permit the free axial clearance of the drive shaft 12 relative to the first driven shaft 14A without interference, i.e. by preventing the secondary body 54 from coming into contact with the primary assembly 38 rearwards or forwards, for all the axial positions of the primary assembly 38 relative to the secondary assembly 40, within the limits of maximum amplitude of axial clearance of one shaft 12 relative to the other 14A.

In the example represented in the figures, the free front end 16 of the drive shaft 12 can be displaced axially in both directions relative to a nominal position of rest, in relation to the first driven shaft 14A.

An arrangement of this type makes it possible to obtain in a simple manner a silent double damping flywheel 24, comprising few parts.

In order to prevent the occurrence of vibration noises from the secondary body 54, a pair of friction elements 94 is interposed axially between the primary assembly 38 and the secondary body 54.

Thus, a first front radial friction washer 94A is interposed between the front surface of the outer annular portion 78 of the secondary body 54 and the rear surface 57 of the inner annular portion 76 of the primary cover 72, and a second rear radial friction washer 94B is interposed between the rear surface of the outer annular portion 78 of the secondary body 54 and the front surface 56 of the primary flywheel 42.

As represented in FIG. 1, the friction washers 94A, 94B are more particularly in contact with the secondary body 54 by means of a flat annular surface which has a very large radial width, in order to permit optimum absorption of the vibrations. In other words, the contact surface between the friction washers 94A, 94B and the secondary body 54 is large, and is not reduced to a simple circular line.

The friction washers 94A, 94B are arranged opposite one another on both sides of the secondary body 54.

These friction washers 94A, 94B are also known by the name of "hysteresis washers". Friction washers of this type are made of a material which is particularly suitable for rubbing on the secondary assembly, without causing problems of premature wear.

These friction washers 94A, 94B are for example made of rigid plastic material.

The term rigid means in this case that the maximum axial resilient deformation of the friction washers 94A, 94B is negligible in comparison with the amplitude of the axial clearance of one shaft relative to the other.

The friction washers 94A, 94B are supported so as to be fixed in rotation relative to the primary assembly 38. The primary assembly 38 thus forms a support assembly for the friction washers 94A, 94B, whereas the secondary assembly 40 forms an assembly which rubs against the friction washers 94A, 94B.

In this case, each friction washer 94A, 94B comprises axial fingers 96, or grooves, which are received in complementary notches in the primary cover 72 and in the primary flywheel 42. The axial fingers 96 thus assure the rotation of the friction washers 94A, 94B by the primary assembly 38. The axial fingers 96 also make it possible to position the washers on the primary assembly 38.

In addition, in order to permit permanent contact of the friction washers 94A, 94B with the secondary body 54, independently of the relative axial position of one shaft 12 in relation to the other 14A, the friction washers 94A, 94B are fitted such as to slide axially on the primary assembly 38. Thus, the axial fingers 96 are free to slide axially in the notches.

The axial length of the fingers 96 is adapted to the maximum amplitude of axial clearance, so that the friction washers 94A, 94B are fixed in rotation relative to the primary assembly 38, irrespective of the axial position of one shaft 12 relative to the other 14A.

The friction washers 94A, 94B and the fingers 96 are advantageously made integrally in a single piece. Thus, the fingers 96 are made of a plastic material.

In order for the contact between the friction washers 94A, 94B and the secondary body 54 to be constant, associated axial pre-stressing means are interposed axially between the associated friction element 94 and the primary assembly 38. In this case, the pre-stressing means are formed by radial washers of the "Belleville" type which are resiliently deformable according to an axial direction.

Thus, a first resilient washer of the "Belleville" type 98A is interposed axially in a compressed state between the front washer 94A and the primary cover 72, in order to thrust the front friction washer 94A axially against the front surface of the secondary body 54, and a second resilient washer 98B of the "Belleville" type is interposed axially in a compressed state between the rear friction washer 94B and the primary flywheel 42 of the primary assembly 38, in order to thrust the rear friction washer 94B against the rear surface of the secondary body 54. The secondary body 54 is thus gripped between the two friction washers 94A, 94B.

The pre-stressing force is determined such that each resilient washer 98 exerts an axial thrust force of the associated friction washer 94 against the secondary body 54, irrespective of the axial position of one shaft 12 relative to the other 14A.

Advantageously, the assembly formed by the resilient washers 98 and the friction washers 94A, 94B also forms a means for sealed closure of the peripheral receptacles 58. The peripheral receptacles 58 are thus closed radially towards the interior, at the level of the throat between the primary flywheel 42 and the primary cover 72.

In fact, it is known to apply lubricating substances, for example grease, in order to reduce the friction between the resilient unit 64 and the walls of the peripheral receptacle 58. The sealed closure of the peripheral receptacles 58 by the resilient washers 98 and by the friction washers 94A, 94B thus makes it possible firstly to prevent particles from soiling the resilient units 64, and secondly to prevent the lubricating substance from being projected onto the friction discs 30, 34.

In addition, it has been found that, when the amplitude of axial clearance is maximum, the stress surface 90 of the lugs 68 of the secondary body 54 can be offset axially relative to the thrust surface 88 of the resilient unit 64 which is axially integral with the primary assembly 38.

In order to eliminate this problem, at least one of the associated axial stress 90 or thrust 88 surfaces has axial dimensions which are sufficient to be in contact with the other surface, irrespective of the axial position of the primary assembly 38 relative to the secondary assembly 40, within the limits of the maximum amplitude of axial clearance of one shaft 12 relative to the other 14A.

Figure 3:
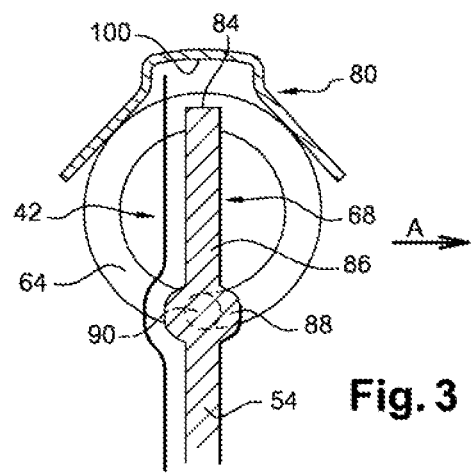
FIG. 3 is a detailed view on an enlarged scale of FIG. 1, showing a lug of the body and a resilient unit with circumferential action.

More particularly, as represented in FIG. 3, the stress surface 90 of the secondary assembly 40 is formed by plastic deformation of a portion of radial axial section 86 of the transverse lug 68, such as to be widened axially relative to the axial thickness of the lug 68.

The plastic deformation of the material which forms the secondary body 54, which in this case is made of metal, is obtained for example by striking perpendicularly the section 86 of the lug 68.

According to a variant, not represented, of the invention, it has also been found that in certain running conditions radial clearance arises between the drive shaft and the first driven shaft.

This therefore gives rise to radial displacement of the secondary body relative to the primary assembly. The axes of the drive shaft and the driven shafts may then no longer be aligned.

If the radially outer end of the lugs touches the inner surface of the skirt of the primary assembly, the secondary body may be damaged.

In addition, disruptions of running are likely to occur, and in particular the lugs are liable to be blocked against one of the circumferential ends of the funnels, thus giving rise to angular blockage without damping, of the secondary body relative to the primary assembly.

In order to eliminate this problem, and as represented in FIG. 3, in order to prevent the lugs 68 of the secondary body 54 from touching the base of the funnel 80 during the simultaneous axial and radial displacement of one shaft 12 relative to the other 14A, the funnel 80 is advantageously formed such as to prevent interference of the lugs 68 of the secondary body 54 with the base of the peripheral receptacle 58.

Thus, the funnel 80 has an axial radial cross-section in the form of a "V", the point of which faces towards the exterior. The funnel 80 is in contact with the resilient body 64 by means of two parallel circular lines.

An annular channel 100 is provided at the base of the funnel 80 between the two contact lines, in order to permit the displacements of the lug 68 of the secondary body 54. The channel 100 extends radially towards the exterior. The channel 100 in the funnel 80 is not in contact with the resilient unit 64.

The axial width of the channel 100 is determined as a function of the maximum amplitude of the axial clearance. In the example represented in FIG. 3, the base of the channel 100 is flat, thus permitting wide axial clearance of the lug 68 when the drive shaft 12 is displaced radially relative to the first driven shaft 14A.

According to a variant of the invention which can be combined with the funnel 80 which comprises a channel 100, the secondary body bears a first stop surface which is arranged with radial play radially opposite a second stop surface of the primary cover, such as to limit the radial displacements of the secondary body relative to the primary assembly. Thus, the outer end of the lug of the secondary body does not touch the base of the peripheral receptacle in the primary assembly, when the drive shaft is displaced radially relative to the first driven shaft.

For this purpose, the radial play between the two stop surfaces is less than the radial play between the outer end of the lugs and the base of the peripheral receptacle.

More particularly, in the presence of a guide funnel, the base of the peripheral receptacle is formed by an inner surface of the funnel. The radial play is then designed such that the outer end of the lugs does not touch the guide channel which in this case forms the base of the peripheral receptacle.

A second embodiment of the invention is represented in FIG. 4. It is globally identical to the first embodiment. The only differences between the two modes will therefore be described hereinafter.

In this case, the double damping flywheel 24 comprises an intermediate body 101 with a structure similar to that of the secondary body 54 of the first embodiment. This intermediate body 101 thus comprises support lugs 68 which are arranged between the two resilient units 64.

The intermediate body 101 is connected in rotation to the secondary assembly 40 by means of a circumferential damping mechanism with angular play. The secondary assembly 40 is in this case formed by two guide washers 106 of the intermediate body 101 which will be described in greater detail hereinafter.

The damping mechanism comprises at least one spring 102 which is similar to that which forms the resilient unit 64, but has different rigidity and dimensions. More particularly, the damping mechanism in this case comprises two springs 102 which are arranged symmetrically relative to a diameter of the intermediate body 101. The arrangement of a single spring 102 will be described, the description being applicable to the other spring 102 by symmetry.

The spring 102 is arranged circumferentially in a window 104 in an arc of a circle which perforates the intermediate body 101. The spring 102 is maintained in the window 104 by the two front and rear guide washers 106 which are arranged on both sides of the intermediate body 101.

In addition, the intermediate body 101 has an annular form which is delimited on the interior by an inner peripheral edge.

The guide washers 106 which form the secondary assembly 40 are in this case identical, and symmetrical relative to the plane of the intermediate body 101. Only a single guide washer 106 will be described hereinafter.

The guide washer 106 has an annular form which extends radially, coaxially to the axis "B". As represented in FIG. 4 in axial cross-section, the washer comprises a first inner annular radial area 108 and a second outer annular radial area 110, which are stepped such that the inner area 108 is offset axially towards the plane of the intermediate body 101 relative to the outer area 110. The two areas 108, 110 are connected to one another by a shank of the material which forms the guide washer 106.

The outer area 110 of the guide washer 106 comprises openings 112 in an arc of a circle which are arranged such as to coincide with the springs 102 of the intermediate body 101. The openings 112 are equipped with means to retain the spring 102 axially in the window 104 in the intermediate body 101, for example the edge in an arc of a circle of the openings 112 comprises axial retention lugs (not represented) which make it possible to accommodate the spring 102, but which prevent the spring 102 from passing through the opening 112.

The inner diameter of the outer area 110 is smaller than the inner diameter of the intermediate body 101, such that the inner area 108 of the guide washer 106 extends towards the interior in the central aperture in the intermediate body 101.

The inner area 108 is offset axially towards the median transverse plane of the intermediate body 101, in order to be placed against the surface opposite of the inner area 108 of the other guide washer 106. In this fitted position, axial play is reserved between the outer areas 110 of the guide washers 106 and the intermediate body 101, in order to allow the intermediate body 101 to rotate around the axis "B", relative to the guide washers 106.

The guide washers 106 are secured to one another by rivets 114, a single one of which is represented in FIG. 4.

The intermediate body 101 is thus trapped axially by the outer areas 110, and radially by the inner areas 108.

The intermediate body 101 is fitted with angular clearance around the axis "B" relative to the guide washers 106, with circumferential damping by the spring 102. The spring 102 is activated by the radial edges (not represented) of the window 104 in the intermediate body 101 on the one hand, and by the radial edges (not represented) opposite of the openings 112 in the guide washers 106 on the other hand.

The secondary assembly 40, which is thus formed by assembly of the guide washers 106, is secured to the connection element 62, as explained in the first embodiment.

Advantageously, the securing of the secondary assembly 40 to the connection element 62 and the securing of the guide washers 106 to one another is carried out by common securing means, Thus, in the example represented in FIG. 4, each securing rivet 114 clamps the washers and the connection element 62 axially.

In this second embodiment, the clutch device 10 does not comprise friction washers. The sealing of the peripheral receptacle 58 of the primary assembly 38 is then carried out by two metal washers 116 with a globally frusto-conical form, which are arranged in opposition on both sides of the guide washers 106.

An inner end of each metal washer 116 is secured to the guide washers 106, in the vicinity of their inner edge.

Advantageously, the metal washers 116 are secured to the guide washers 106 by the rivets 114 for securing of the guide washers 106 to the connection element 62.

The metal washers 116 extend radially towards the exterior and axially towards a surface 56, 57 of the primary assembly 38 opposite. The metal washers 116 are resiliently deformable, and are fitted pre-stressed axially such that the outer end edge of the metal washers 116 is constantly placed against the associated surfaces 56, 57 opposite of the primary assembly 38.

The outer end edge of the metal washers 116 is thus in constant contact with the primary assembly 38, as a result of the resilience of the washers themselves.

Thus, the metal washers 116 are integral in rotation with the secondary assembly 40, and are in permanent contact with the primary assembly 38, in order to permit suitable sealing of the peripheral receptacles 58, by sliding on the surfaces 56, 57 of the primary assembly 38.

The metal washers 116 are thus placed axially on the surfaces 56 57 of the primary assembly 38, and slide on the said surfaces 56, 57. Thus, according to the primary definition of the verb "to rub", the metal washers 116 rub on the primary assembly.

Figure 5:
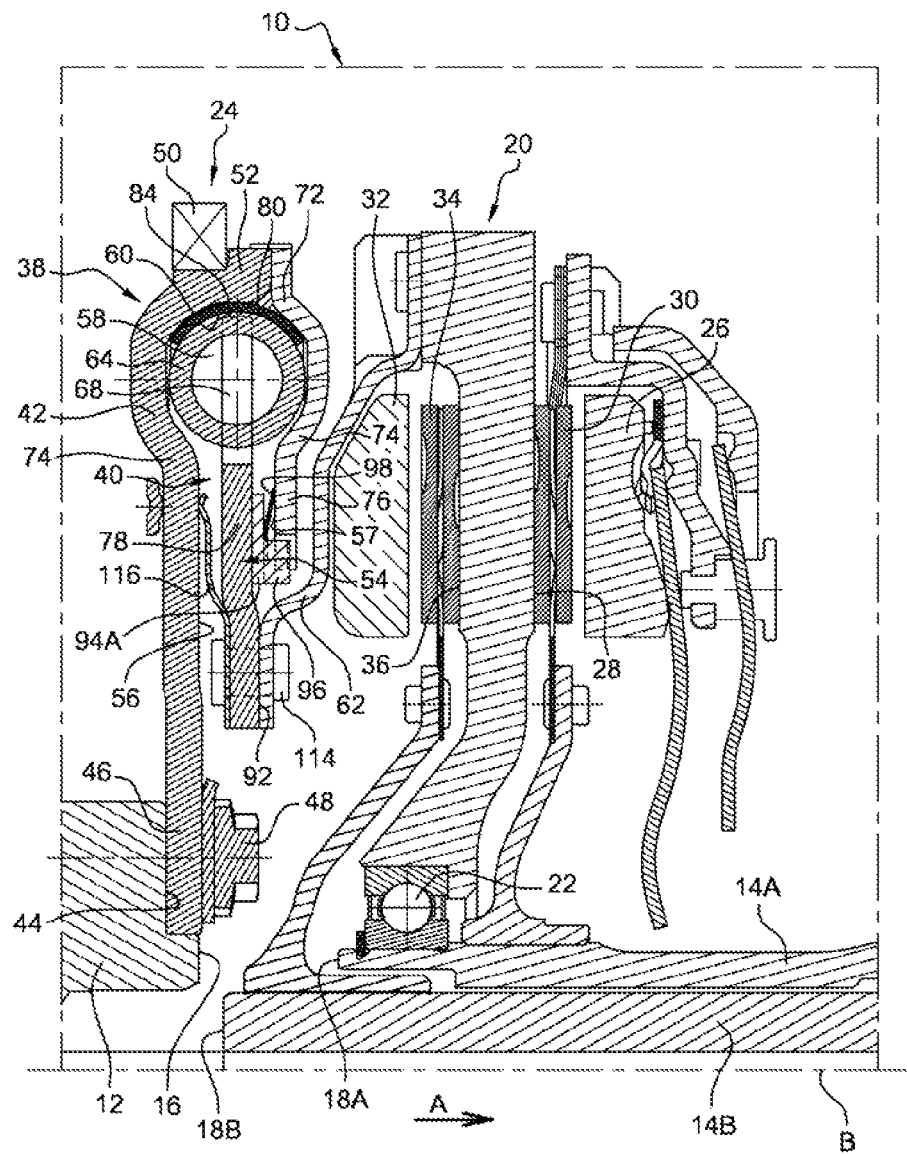
FIG. 5 is a view similar to that of FIG. 1, which represents a third embodiment of the invention.

A third embodiment is shown in FIG. 5. It is globally identical to the first embodiment. Only the differences between the two embodiments are thus described hereinafter.

In this third embodiment, the second rear radial friction washer 94B has been replaced by a sealing washer 116, as described in the third embodiment, which is interposed between the rear surface of the outer annular portion 78 of the secondary body 54, and the front surface 56 of the primary flywheel 42.

An inner end of the metal washer 116 is secured to the rear surface of the secondary body 54, in the vicinity of its inner edge.

Advantageously, the metal washer 116 is secured to the secondary body 54 by the rivets 114 which secure the secondary body 54 to the connection element 62.

The metal washer 116 extends radially towards the exterior, and axially towards the front surface 56 of the primary flywheel 42. The metal washer 116 is resiliently deformable, and is fitted pre-stressed axially, such that the outer end edge of the metal washer 116 is constantly placed against the front surface 56 of the primary flywheel 42.

The outer edge of the metal washer 116 is in contact with the primary flywheel 42 axially opposite the friction washer 94A.

The outer end edge of the metal washer 116 is thus in constant contact with the primary assembly 38, as a result of its own resilience.

Thus, the metal washer 116 is integral in rotation with the secondary assembly 40, and it is in permanent contact with the primary assembly 38, in order to permit suitable sealing of the peripheral receptacles 58, by rubbing on the rear surface 56 of the primary flywheel 42, in co-operation with the friction washer 94A which is pre-stressed by the resilient washer 98.

The invention has been described in application to a clutch comprising a plurality of friction discs. It will be understood that the double damping flywheel produced according to the teaching of the invention can also be applied to other types of friction clutches, and in particular friction clutches which comprise only a single friction disc.

The clutch device produced according to the teaching of the invention thus makes it possible to obtain a silent double damping flywheel in a manner which is simple and inexpensive, by securing the secondary assembly 40 rigidly to the driven shaft.

The invention claimed is:

1. A friction clutch device (10) for coupling a first drive shaft (12) to at least one second driven shaft (14A) and providing at least one free relative axial clearance of the first drive shaft (12) in relation to the second driven shaft (14A), the friction clutch device comprising a double damping flywheel (24) comprising:
   a primary torque intake assembly (38) fixedly secured axially on a front end section of the first drive shaft (12);
   a secondary torque output assembly (40) connected in rotation to a reaction plate (20) of the clutch device (10), and supported by a rear end section of the at least one second driven shaft (14A), the secondary assembly (40) being fixedly secured axially relative to the reaction plate (20); and
   at least one resilient unit (64) with circumferential action provided in a peripheral receptacle (58) of the primary assembly (38), in order to connect the secondary assembly (40) to the primary assembly (38) in rotation, with circumferential damping;
   the reaction plate (20) axially fixed relative to the at least one second driven shaft (14A), such that the secondary assembly (40) fixed axially relative to the at least one second driven shaft (14A);
   the secondary assembly (40) fitted in the primary assembly (38) with sufficient axial play (J1) to permit free axial clearance of the first drive shaft (12) relative to the at least one second driven shaft (14A) without interference between the primary assembly (38) and the secondary assembly (40).

2. The friction clutch device (10) according to claim 1, further comprising at least one friction element (94, 94B, 98, 116) which is interposed axially between the primary assembly (38) and the secondary assembly (40), and closes constantly in a sealed manner the peripheral receptacle (58) in the primary assembly (38) which accommodates the at least one resilient unit with circumferential action (64); wherein the at least one friction element (94A, 94B, 98, 116) is fitted fixed in rotation relative to one of the primary torque intake assembly and the secondary torque output assembly, defined as a support assembly, and rubs against the other one of the primary torque intake assembly and the secondary torque output assembly, defined as a friction assembly.

3. The friction device (10) according to claim 2, wherein the primary assembly (38) comprises a rear primary flywheel (42) and a front primary cover (72) which are arranged axially on both sides of the secondary assembly (40), wherein the at least one friction element (94, 94B, 98, 116) includes a pair of friction elements; wherein a first one of the friction elements (94A, 98, 116) is interposed axially between the secondary assembly (40) and the primary cover (72), and wherein a second one of the friction elements (94B, 98, 116) is interposed axially between the primary flywheel (42) and the secondary assembly (40).

4. The friction device (10) according to claim 3, wherein:
   the first friction element (94A, 98) is interposed axially between the primary assembly (38) and the secondary assembly (40) so as to prevent the occurrence of noises from vibration of the secondary assembly (40), the first friction element is fitted so as to slide axially on the primary assembly (38), axial pre-stressing means (98) are interposed axially between the first friction element (94A, 94B) and the primary assembly (38) in order to maintain constant contact between the first friction element (94A, 94B) and the secondary assembly (40); and
   the second friction element (116) is formed by a sealing washer (116) secured to the secondary assembly (40), and is in permanent contact with the primary assembly (38) by means of resilience so as to permit sealing which is adapted to the peripheral receptacle (58).

5. The friction clutch device (10) according to claim 2, wherein the at least one friction element (94A, 94B) is interposed axially between the primary assembly (38) and the secondary assembly (40), so as to prevent the occurrence of noises from vibration of the secondary assembly (40), and wherein the at least one friction element (94A, 94B) is fitted so as to slide axially on the primary assembly (38).

6. The friction clutch device (10) according to claim 5, wherein axial pre-stressing means (98) are interposed axially between the at least one friction element (94A, 94B) and the support assembly in order to maintain constant contact between the at least one friction element (94A, 94B) and the friction assembly.

7. The friction clutch device (10) according to claim 6, wherein the axial pre-stressing means are formed by radial washers (98) which are resiliently deformable in an axial direction.

8. The friction clutch device (10) according to claim 7, wherein at least one friction element is formed by a sealing washer (116) which is secured to the support assembly, and is in permanent contact with the friction assembly by means of resilience so as to permit sealing which is adapted to the peripheral receptacle (58);
   wherein the front end section of the drive shaft (12) is free to be displaced relative to the rear end section of the at least one second driven shaft (14A);
   wherein the secondary assembly (40) is arranged with radial play (J2) relative to the primary assembly (38), so as to permit the free radial clearance of the first drive shaft (12) relative to the at least one second driven shaft (14A); and
   wherein the base (80, 100) of the peripheral receptacle (58) which accommodates the at least one resilient unit (64) is formed such as to permit the radial and axial clearances of a transverse lug (68) of the at least one resilient unit (64) of the secondary assembly (40).

9. The friction clutch device (10) according to claim 5, wherein the at least one friction element (94, 94B, 98, 116) includes a pair of friction elements (94A, 94B) which are arranged axially on opposite sides of the secondary assembly (40).

10. The friction clutch device (10) according to claim 2, wherein the at least one friction element is formed by a sealing washer (116) which is secured to one of the primary assembly (38) and the secondary assembly (40), and is in permanent contact with the other one of the primary assembly (38) and the secondary assembly (40) by means of resilience so as to permit sealing of the peripheral receptacle (58).

11. The friction device (10) according to claim 10, wherein the sealing washer is formed by a metal washer (116).

12. The friction clutch device (10) according to claim 1, wherein the secondary assembly (40) comprises at least one axial surface (88) for stressing an associated axial thrust surface (90) opposite the resilient unit with circumferential action (64); and wherein at least one of the associated axial stressing (88) or thrust (90) surfaces has axial dimensions which are sufficient to be opposite the other surface (90, 88) during the axial clearance of the first drive shaft (12) relative to the at least one second driven shaft (14A).

13. The friction clutch device (10) according to claim 12, wherein the thrust surface (88) of the secondary assembly (40) is formed by plastic deformation of a portion of axial radial section (86) of a transverse lug (68), so as to be widened axially relative to the axial thickness of the transverse lug.

14. The friction clutch device (10) according to claim 12, wherein the double damping flywheel (24) comprises means for limiting the radial clearance of the first drive shaft relative to the at least one second driven shaft.

15. The friction clutch device (10) according to claim 1, wherein the secondary assembly (40) comprises a secondary body (54).

16. The friction clutch device (10) according to claim 1, further comprising an intermediate body (101) which is connected in rotation to the secondary assembly (40) by means of a circumferential damping mechanism with angular play (102, 106).

17. The friction clutch device (10) according to claim 1, wherein the front end section of the drive shaft (12) is free to be displaced relative to a rear end section of the at least one second driven shaft (14A); and wherein the secondary assembly (40) is arranged with radial play (J2) relative to the primary assembly (38), so as to permit the free radial clearance of the first drive shaft (12) relative to the at least one second driven shaft (14A).

* * * * *